(12) United States Patent
Jatti et al.

(10) Patent No.: US 12,223,034 B2
(45) Date of Patent: Feb. 11, 2025

(54) SECURE VOICE INTERFACE IN A STREAMING MEDIA DEVICE TO AVOID VULNERABILITY ATTACKS

(71) Applicant: ARRIS Enterprises LLC, Suwanee, GA (US)

(72) Inventors: Vinod Jatti, Karnataka (IN); Remesh Kousalya Sugunan, Trivandrum (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 338 days.

(21) Appl. No.: 17/476,622

(22) Filed: Sep. 16, 2021

(65) Prior Publication Data

US 2022/0129543 A1 Apr. 28, 2022

Related U.S. Application Data

(60) Provisional application No. 63/106,044, filed on Oct. 27, 2020.

(51) Int. Cl.
| | |
|---|---|
| G06F 21/53 | (2013.01) |
| G06F 21/60 | (2013.01) |
| G10L 15/22 | (2006.01) |
| G10L 15/30 | (2013.01) |

(52) U.S. Cl.
CPC ............ *G06F 21/53* (2013.01); *G06F 21/602* (2013.01); *G10L 15/22* (2013.01); *G10L 15/30* (2013.01); *G10L 2015/223* (2013.01)

(58) Field of Classification Search
CPC ........ G06F 21/53; G06F 21/602; G06F 21/00; G06F 21/60; G06F 1/1613; G10L 15/22; G10L 15/30; G10L 2015/223
See application file for complete search history.

(56) References Cited

U.S. PATENT DOCUMENTS

| | | | | |
|---|---|---|---|---|
| 9,368,107 | B2 * | 6/2016 | Hanson | ................... G10L 15/06 |
| 9,940,930 | B1 * | 4/2018 | Campbell | ............... G10L 15/22 |
| 2020/0374269 | A1 * | 11/2020 | Lidman | ................... H04L 63/10 |
| 2020/0380139 | A1 * | 12/2020 | Kashani | ............... G06F 21/602 |
| 2021/0050010 | A1 * | 2/2021 | Lu | ........................... G10L 15/08 |

FOREIGN PATENT DOCUMENTS

WO   WO-2007055766 A2 * 5/2007 ............. G06F 3/167

* cited by examiner

*Primary Examiner* — Ali S Abyaneh
*Assistant Examiner* — Brandon Binczak
(74) *Attorney, Agent, or Firm* — Wenderoth, Lind & Ponack, L.L.P.

(57) ABSTRACT

An apparatus, method, and computer-readable recording medium receives secure voice commands by an application executing within a smart media device while attached to the Internet. A controller of a smart media device activates an application within the smart media device, determines whether or not the application uses secure voice commands, and when the smart media device determines that the application uses secure voice commands, performs the following: enables the trusted execution environment to receive and decrypt the encrypted audio data and generate application commands corresponding to processing decrypted voice commands, receives, by the application, application commands corresponding to processing decrypted voice commands, and performs the application commands.

14 Claims, 5 Drawing Sheets

SECURE VOICE INTERFACE IN A STREAMING MEDIA DEVICE TO AVOID VULNERABILITY ATTACKS

TECHNICAL FIELD

The subject matter of the present disclosure relates generally to management and control of wireless devices in a wireless network.

BACKGROUND

There has been a rapid rise in the use of wireless devices in wireless networks, which has increased traffic drastically, degraded the quality of service, and reduced the coverage capabilities of many network devices (e.g., gateways, access points, and wireless extenders). One class of wireless devices includes smart media devices that connect to remote content servers to obtain streaming media content data upon request of a user for displaying to and viewing by the user. In order to interact with these smart media devices, users are beginning to provide voice command interfaces in which voice data may be captured from the user near the smart media device.

Technology to process and decode voice command data into commands to be executed by an application is beginning to mature. Applications that attempt to use these voice commands gain access to an input device such as a microphone to be able to listen when users are issuing commands. Unfortunately, applications that run on smart media devices are available from a variety of sources. These sources may include untrustworthy parties who want to gain access to a user's microphone to be able to listen into the users when they are using the smart media devices. Applications also may be infected with malware and viruses that attempt to accomplish the same using other party's applications.

Thus, it would be advantageous and an improvement over the relevant technology to provide a smart media device for providing secure voice commands to an application executing within the smart media device while attached to the Internet. The present invention attempts to address the limitations and deficiencies of prior art solutions according to principles and example embodiments disclosed herein.

SUMMARY

An aspect of the present disclosure provides a smart media device for providing secure voice commands to an application executing within the smart media device while attached to the Internet. The wireless network is configured to communicatively interconnect the gateway device, a smart media device, and one or more client devices. In this aspect of the present disclosure, the smart media device includes a network controller, a non-transitory memory storing a program, and a communication interface configured to establish communication connections with the one or more client devices and the smart media device via the wireless network.

The network controller is configured to execute the program to receive secure voice commands by an application executing within the smart media device while attached to the Internet. A controller of a smart media device activates an application within the smart media device, determines whether or not the application uses secure voice commands and when the smart media device determines that the application uses secure voice commands, performs the following: enables the trusted execution environment to receive and decrypt the encrypted audio data and generate application commands corresponding to processing decrypted voice commands, receives—by the application—application commands corresponding to processing decrypted voice commands, and performs the application commands.

In an aspect of the present disclosure, the controller of the smart media device determines whether or not the application uses a remote voice-speech server and when the smart media device determines that the encrypted voice commands are to be processed by a remote voice-speech server, performs the following: enables the trusted execution environment to receive the encrypted audio data, sends the encrypted audio data to the remote voice-speech server for processing, receives, by the application, application commands corresponding to processing decrypted voice commands, and performs the application commands.

In an aspect of the present disclosure, the controller of the smart media device determines whether or not the application uses a remote voice-speech server and when the smart media device determines that the encrypted voice commands are not to be processed by a remote voice-speech server, performs the following: enables the trusted execution environment to receive the encrypted audio data, receives and decrypts—by the trusted execution environment—the encrypted audio data, generates the application commands corresponding to processing decrypted voice commands—by the trusted execution environment—receives by the application commands corresponding to processing decrypted voice commands, and performs the application commands corresponding to processing decrypted voice commands.

In an aspect of the present disclosure, when the controller of the smart media device determines that the application does not use secure voice commands, performs the following: enables the secure microphone to transmit clear voice data to a voice service environment, receives clear voice data from the secure microphone, generates the application commands from the clear voice data, and sends the application commands to the application.

In another aspect of the present disclosure, the voice service environment is configured to execute the instructions on the memory by the processor.

In another aspect of the present disclosure, when the controller of the smart media device determines that the application does not use secure voice commands, performs the following: enables the secure microphone to transmit clear voice data and sends the clear voice data to the application.

An aspect of the present disclosure provides a method for providing secure voice commands to an application executing within the smart media device while attached to the Internet. The wireless network is configured to communicatively interconnect a gateway device, a smart media device, and one or more client devices. The method includes activating an application within the smart media device and determining whether or not the application uses secure voice commands; when the smart media device determines that the application uses secure voice commands, performs the following: enables the trusted execution environment to receive and decrypt the encrypted audio data, receives—by the application—the decrypted voice commands, and performs the decrypted voice commands.

An aspect of the present disclosure provides a non-transitory computer-readable recording medium in a gateway device for providing secure voice commands to an application executing within the smart media device while attached to the Internet. The wireless network is configured to communicatively interconnect the gateway device, a smart media device, and one or more client devices and the non-transitory computer-readable recording medium storing one or more programs, which when executed by a network controller of the gateway device, performs steps of the methods described above.

BRIEF DESCRIPTION OF THE DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded as merely examples. Accordingly, those of ordinary skill in the art will recognize that various changes and modifications of the examples described herein can be made without departing from the spirit and scope of the present disclosure. In addition, descriptions of well-known functions and constructions may be omitted for clarity and conciseness.

The terms and words used in the following description and claims are merely used to enable a clear and consistent understanding of the present disclosure. Accordingly, it should be apparent to those skilled in the art that the following description of the present disclosure is provided for illustrative purposes only, and not for the purpose of limiting the present disclosure as defined by the appended claims and their equivalents.

Figure 1:
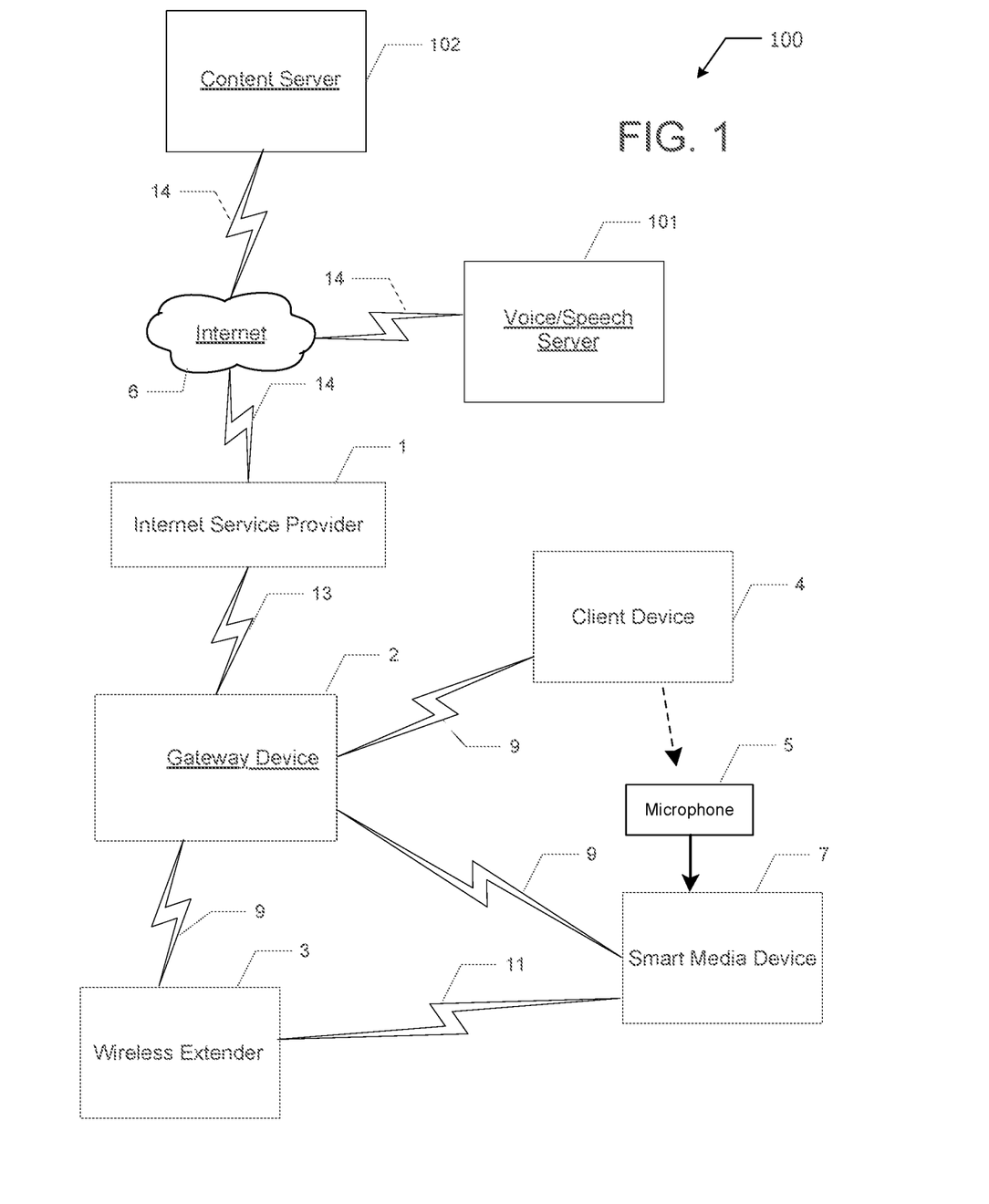
FIG. 1 is a schematic diagram of a system according to an embodiment of the present disclosure.

FIG. 1 is a schematic diagram of a system according to an embodiment of the present disclosure. As shown in FIG. 1, the main elements of the system include a gateway device 2 connected to the Internet 6 via an Internet Service Provider (ISP) 1 and also connected to different wireless devices such as a smart media device 7, wireless extenders 3, and client devices 4. A content server 102 and a voice-speech server 101 are also connected to the Internet 6 for use by the smart media device 7. The content server 102 provides streaming media content data to the smart media device 7 for display to a user via an attached display device such as a television or large screen display.

A voice-speech server 101 provides a remote speech processing service to the smart media device 7 to convert voice commands received by the smart media device 7 from an attached microphone 5. The voice commands are received as digitized audio data and processed to provide the smart media device 7 with instructions to control its operation. In some embodiments of the present invention, the voice commands may be processed by the voice-speech server 101, while in alternate embodiments the voice command processing may be performed within the smart media device 7.

The system shown in FIG. 1 includes wireless devices (e.g., smart media device 7, wireless extenders 3, and client devices 4) that may be connected in one or more wireless networks (e.g., private, guest, iControl, backhaul network, or Internet of things (IoT) network) within the system. Additionally, there could be some overlap between wireless devices (e.g., smart media device 7, wireless extenders 3, and client devices 4) in the different networks. That is, one or more network devices could be located in more than one network. For example, the smart media device 7 could be located both in a private network for providing content and information to a client device 4 and also included in a backhaul network or an iControl network.

Starting from the top of FIG. 1, the ISP 1 can be, for example, a streaming video provider or any content server computer 102 providing streaming media data to the smart media device 7 via the gateway device 2 over the Internet 6. The connection 14 between the Internet 6 and the ISP 1 and the connection 13 between the ISP 1 and the gateway device 2 can be implemented using, for example, a wide area network (WAN), a virtual private network (VPN), metropolitan area networks (MANs), system area networks (SANs), a DOCSIS network, a fiber optics network (e.g., FTTH (fiber to the home) or FTTX (fiber to the x), or hybrid fiber-coaxial (HFC)), a digital subscriber line, a public switched data network (PSDN), a global Telex network, or a 2G, 3G, 4G or 5G network.

The connection 13 can further include as some portion thereof a broadband network connection, an optical network connection or other similar connections. For example, the connection 13 can also be implemented using a fixed wireless connection that operates in accordance with, but is not limited to, 3rd Generation Partnership Project (3GPP), Long Term Evolution (LTE) or 5G protocols.

The gateway device 2 can be, for example, a hardware electronic device that may be a combination modem and gateway device that combines the functions of a modem, an access point, and/or a router for providing content received from the content provider 1 to network devices (e.g., wireless extenders 3 and client devices 4) in the system. It also is contemplated by the present disclosure that the gateway device 2 can include the function of, but is not limited to, an Internet Protocol/Quadrature Amplitude Modulator (IP/QAM) set-top box (STB) or smart media device (SMD) that is capable of decoding audio/video content and playing over-the-top (OTT)- or multiple system operator (MSO)-provided content. The gateway device 2 therefore may include the functionality of a smart media device 7 that receives streaming media content data from the content server 102 for display to the user. In the embodiment of FIG. 1, the smart media device 7 is depicted as a separate device in order to emphasize the voice command processing associated with the smart media device 7; functions that are separate from the creation and maintenance of a wireless network provided by a gateway device 2.

The smart media device 7 communicates with the content server 102 to identify streaming media content that the user wishes to view. The smart media device 7 accepts input commands from the user to instruct the playing of the streaming media content onto a display device. The smart media device 7 then requests the content server 102 to send the streaming media content as a data stream over the Internet 6 to the smart media device 7.

The connection 9 between the gateway device 2, the wireless extenders 3, smart media device 7, and client devices 4 can be implemented using a wireless connection in accordance with any IEEE 802.11 Wi-Fi protocols, Bluetooth protocols, Bluetooth Low Energy (BLE) protocols, or other short range protocols that operate in accordance with wireless technology standard for exchanging data over short distances using any licensed or unlicensed band such as the citizens broadband radio service (CBRS) band, 2.4 GHz bands, 5 GHz bands, 6 GHz bands, or 60 GHZ bands. Additionally, the connection 9 can be implemented using a wireless connection that operates in accordance with, but is not limited to, RF4CE, ZigBee, Z-Wave or IEEE 802.15.4 protocols. It also is contemplated by the present disclosure that the connection 9 can include connections to a media over coax (MoCA) network. One or more of the connections 9 also can be a wired Ethernet connection.

The wireless extenders 3 can be, for example, hardware electronic devices such as access points used to extend the wireless network by receiving the signals transmitted by the gateway device 2 and rebroadcasting the signals to, for example, client devices 4 which may be out of range of the gateway device 2. The wireless extenders 3 also can receive signals from the client devices 4 and rebroadcast the signals to the gateway device 2 or other client devices 4.

The connection 11 between the wireless extenders 3 and the smart media devices 7 are implemented through a wireless connection that operates in accordance with any IEEE 802.11 Wi-Fi protocols, Bluetooth protocols, Bluetooth Low Energy (BLE) protocols, or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. Additionally, the connection 11 can be implemented using a wireless connection that operates in accordance with, but is not limited to, RF4CE, ZigBee, Z-Wave or IEEE 802.15.4 protocols. Also, one or more of the connections 11 can be a wired Ethernet connection.

The client devices 4 can be, for example, hand-held computing devices, personal computers, electronic tablets, smart phones, smart speakers, IoT devices, iControl devices, portable music players with smart capabilities capable of connecting to the Internet, and cellular networks interconnecting with other devices via Wi-Fi and Bluetooth, or other wireless hand-held consumer electronic devices capable of executing and displaying content received through the gateway device 2. Additionally, the client devices 4 can be a TV, an IP/QAM STB or an SMD that is capable of decoding audio/video content and playing over OTT- or MSO-provided content received through the gateway device 2.

Figure 2:
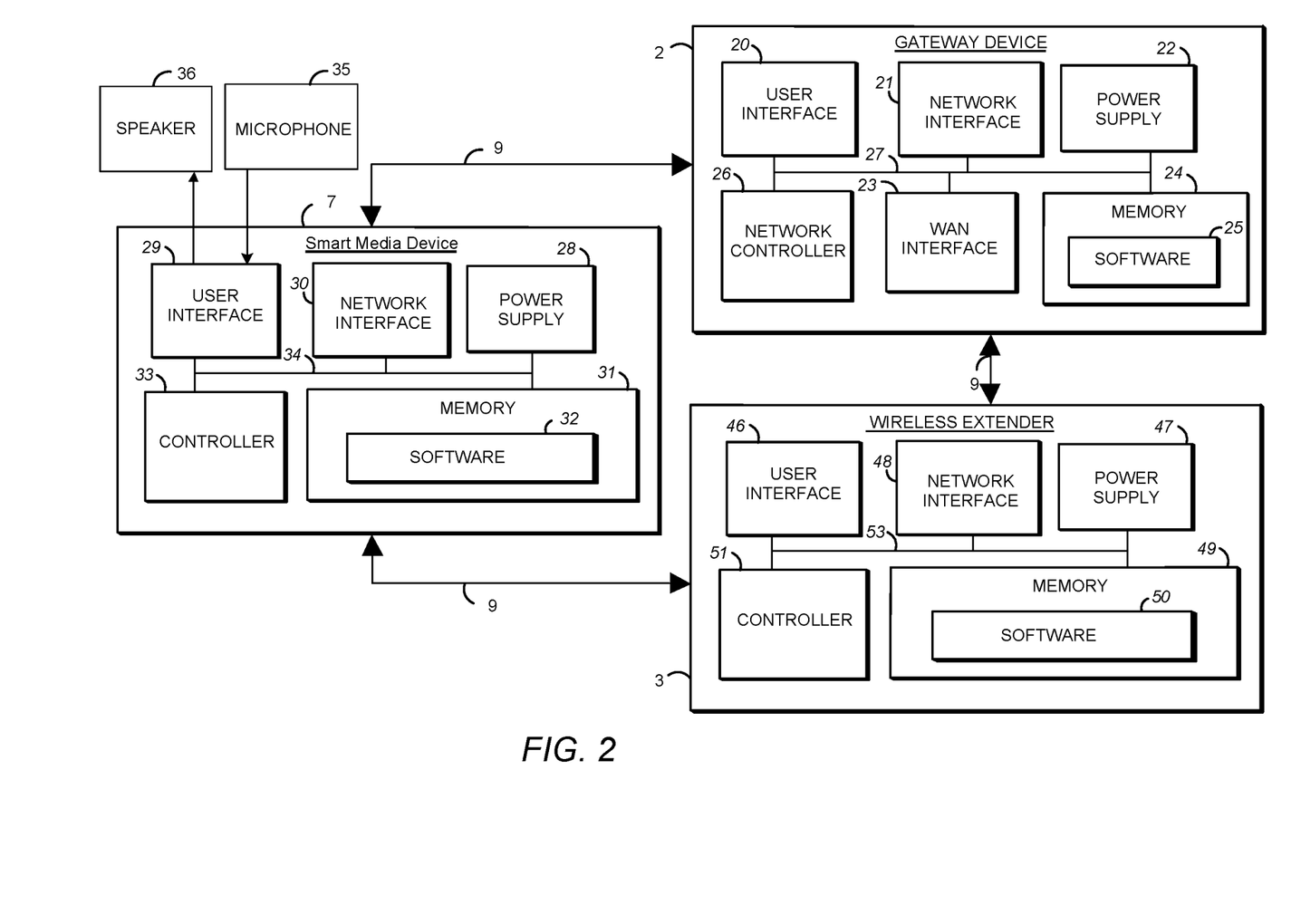
FIG. 2 is a more detailed schematic diagram of an exemplary gateway device, client device, and smart media device implemented in the system of FIG. 1 according to an embodiment of the present disclosure.

A detailed description of the exemplary internal components of the gateway device 2, the wireless extenders 3, and the client devices 4 shown in FIG. 1 will be provided in the discussion of FIG. 2. However, in general, it is contemplated by the present disclosure that the gateway device 2, the wireless extenders 3, and the client devices 4 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium.

Further, any, all or some of the computing components in the gateway device 2, the wireless extenders 3, and the client devices 4 may be adapted to execute any operating system, including Linux, UNIX, Windows, MacOS, DOS, and ChromOS as well as virtual machines adapted to virtualize execution of a particular operating system, including customized and proprietary operating systems. The gateway device 2, the wireless extenders 3, and the client devices 4 are further equipped with components to facilitate communications with other computing devices over the one or more network connections to local and wide area networks, wireless and wired networks, public and private networks, and any other communication network enabling communication in the system.

FIG. 2 is a more detailed schematic diagram of an exemplary gateway device 2, an exemplary wireless extender 3, and an exemplary smart media device 7 implemented in the system of FIG. 1 according to an embodiment of the present disclosure. Although FIG. 2 only shows one wireless extender 3 and smart media device 7, the wireless extender 3 and the smart media device 7 shown in the figure are meant to be representative of the other wireless extenders 3 and smart media device 7 shown in FIG. 1. Similarly, the connections 9 between the gateway device 2, the wireless extender 3, and the smart media device 7 shown in FIG. 2 are meant to be exemplary connections and are not meant to indicate all possible connections between the gateway devices 2, wireless extenders 3, and smart media device 7. Additionally, it is contemplated by the present disclosure that the number of gateway devices 2, wireless extenders 3, and smart media devices 7 is not limited to the number of gateway devices 2, wireless extenders 3, and smart media devices 7 shown in FIGS. 1 and 2.

Now referring to FIG. 2 (e.g., from left to right), the smart media device 7 can be, for example, a computer, a portable device, an electronic tablet, an e-reader, a PDA, a smart phone, a smart speaker, an IoT device, an iControl device, portable music player with smart capabilities capable of connecting to the Internet, and cellular networks interconnecting with other devices via Wi-Fi and Bluetooth, or other wireless hand-held consumer electronic device capable of executing and displaying the content received through the gateway device 2. Additionally, the smart media device 7 can be a TV, an IP/QAM STB, or an SMD that is capable of decoding audio/video content, and playing over OTT- or MSO-provided content received through the gateway device 2.

As shown in FIG. 2, the smart media device 7 includes a power supply 28, user interface 29, network interface 30, a memory 31, speaker 36, microphone 35, and a controller 33. The power supply 28 provides power to the internal components of the client device 4 through the internal bus 34. The power supply 28 can be a self-contained power source such as a battery pack with an interface to be powered through an electrical charger connected to an outlet (e.g., either directly or by way of another device). The power supply 28 also can include a rechargeable battery that can be detached allowing for replacement such as nickel-cadmium (NiCd), nickel metal hydride (NiMH), lithium-ion (Li-ion) or lithium polymer (Li-pol) batteries.

The user interface 29 includes, but is not limited to, push buttons, keyboard, keypad, liquid crystal display (LCD), cathode ray tube (CRT), thin film transistor (TFT), light-emitting diode (LED), high definition (HD) or other similar display device including a display device having touch screen capabilities so as to allow interaction between a user and the smart media device 7. The speaker 36 and microphone 35 provide an audio input and output component to the user interface 29. The network interface 30 can include, but is not limited to, various network cards, interfaces, and circuitry implemented in software and/or hardware to enable communications with the gateway device 2 and the wireless extender 3 using the wireless protocols in accordance with connection 9 (e.g., as described with reference to FIG. 1).

The memory 31 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 31 can be used to store any type of instructions, software or algorithms for controlling the general function and operations of the smart media device 7 in accordance with the embodiments described in the present disclosure (e.g., including the optimized onboarding of user devices according to the embodiments of the present disclosure).

The controller 33 controls the general operations of the smart media device 7 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP) or other similar processing device capable of executing any type of instructions, algorithms or software for controlling the operation and functions of the smart media device 7 in accordance with the embodiments described in the present disclosure. Communications between the components (e.g., 28-31 and 33) of the smart media device 7 may be established using an internal bus 34.

The wireless extender 3 can be, for example, a hardware electronic device such as an access point used to extend a wireless network by receiving the signals transmitted by the gateway device 2 and rebroadcasting the signals to client devices 4, which may be out of range of the gateway device 2. The wireless extender 3 also can receive signals from the client devices 4 and rebroadcast the signals to the gateway device 2, mobile device 5, smart media device 7 or other client devices 4.

As shown in FIG. 2, the wireless extender 3 includes a user interface 46, a power supply 47, a network interface 48, a memory 49, and a controller 51. The user interface 46 can include, but is not limited to, push buttons, a keyboard, a keypad, an LCD, a TFT, an LED, an HD or other similar display device including a display device having touch screen capabilities so as to allow interaction between a user and the wireless extender 3. The power supply 47 supplies power to the internal components of the wireless extender 3 through the internal bus 53. The power supply 47 can include a self-contained power source such as a battery pack with an interface to be powered through an electrical charger connected to an outlet (e.g., either directly or by way of another device). The power supply 47 can also include a rechargeable battery that can be detached allowing for replacement such as a NiCd, a NiMH, a Li-ion, or a Li-pol battery.

The network interface 48 can include various network cards, interfaces, and circuitry implemented in software and/or hardware to enable communications with the client device 4, smart media device 7, and the gateway device 2 using the wireless protocols in accordance with connection 9 (e.g., as described with reference to FIG. 1). The memory 49 can include a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk or any other various layers of memory hierarchy.

The memory 49 can be used to store any type of instructions, software or algorithm including software 50 associated with controlling the general function and operations of the wireless extender 3 in accordance with the embodiments described in the present disclosure (e.g., including optimized onboarding of user devices according to the embodiments of the present disclosure).

The controller 51 controls the general operations of the wireless extender 3 and can include, but is not limited to, a CPU, a hardware microprocessor, a hardware processor, a multi-core processor, a single core processor, an FPGA, a microcontroller, an ASIC, a DSP or other similar processing device capable of executing any type of instructions, algorithms or software for controlling the operation and functions of the wireless extender 3 in accordance with the embodiments described in the present disclosure. General communications between the components (e.g., 46-49 and 51) of the wireless extender 3 may be established using the internal bus 53.

The gateway device 2 can be, for example, a hardware electronic device that can combine the functions of a modem, an access point, and/or a router for providing content received from the content provider 1 to network devices (e.g., wireless extenders 3, client devices 4, and smart media device 7) in the system. It also is contemplated by the present disclosure that the gateway device 2 can include the function of, but is not limited to, an IP/QAM STB or SMD that is capable of decoding audio/video content, and playing OTT- or MSO-provided content.

As shown in FIG. 2, the gateway device 2 includes a user interface 20, a network interface 21, a power supply 22, a WAN interface 23, a memory 24, and a network controller 26. The user interface 20 can include, but is not limited to, push buttons, a keyboard, a keypad, an LCD, a CRT, a TFT, an LED, an HD or other similar display device including a display device having touch screen capabilities so as to allow interaction between a user and the gateway device 2. The network interface 21 may include various network cards, and circuitry implemented in software and/or hardware to enable communications with the wireless extender 3, smart media device 7, and client device 4 using the wireless protocols in accordance with connection 9 (e.g., as described with reference to FIG. 1). Additionally, the various network cards, interfaces, and circuitry of the network interface 21 enable communications with the mobile device using the wireless protocols in accordance connection 10 (e.g., as described with reference to FIG. 1).

The power supply 22 provides power to the internal components of the gateway device 2 through the internal bus 27. The power supply 22 can be a self-contained power source such as a battery pack with an interface to be powered through an electrical charger connected to an outlet (e.g., either directly or by way of another device). The power supply 22 also can include a rechargeable battery that can be detached allowing for replacement such as NiCd, NiMH, Li-ion or Li-pol batteries. The WAN interface 23 may include various network cards and circuitry implemented in software and/or hardware to enable communications between the gateway device 2 and the ISP 1 using the wireless protocols in accordance with connection 13 (e.g., as described with reference to FIG. 1).

The memory 24 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 24 can be used to store any type of instructions, software or algorithm including software 25 for controlling the general function and operations of the gateway device 2 and performing management functions related to the other devices (wireless extenders 3, smart media device 7, and client device 4) in the network in accordance with the embodiments described in the present disclosure (e.g., including optimized onboarding of user devices according to the embodiments of the present disclosure).

The network controller 26 controls the general operations of the gateway device 2 as well as performs management functions related to the other devices (wireless extenders 3 and client device 4) in the network. The network controller can include, but is not limited to, a CPU, a hardware microprocessor, a hardware processor, a multi-core processor, a single core processor, a FPGA, a microcontroller, an ASIC, a DSP or other similar processing device capable of executing any type of instructions, algorithms or software for controlling the operations and function of the gateway device 2 in accordance with the embodiments described in the present disclosure. Communications between the components (e.g., 20-24, and 26) of the gateway device 2 may be established using the internal bus 27.

Figure 3:
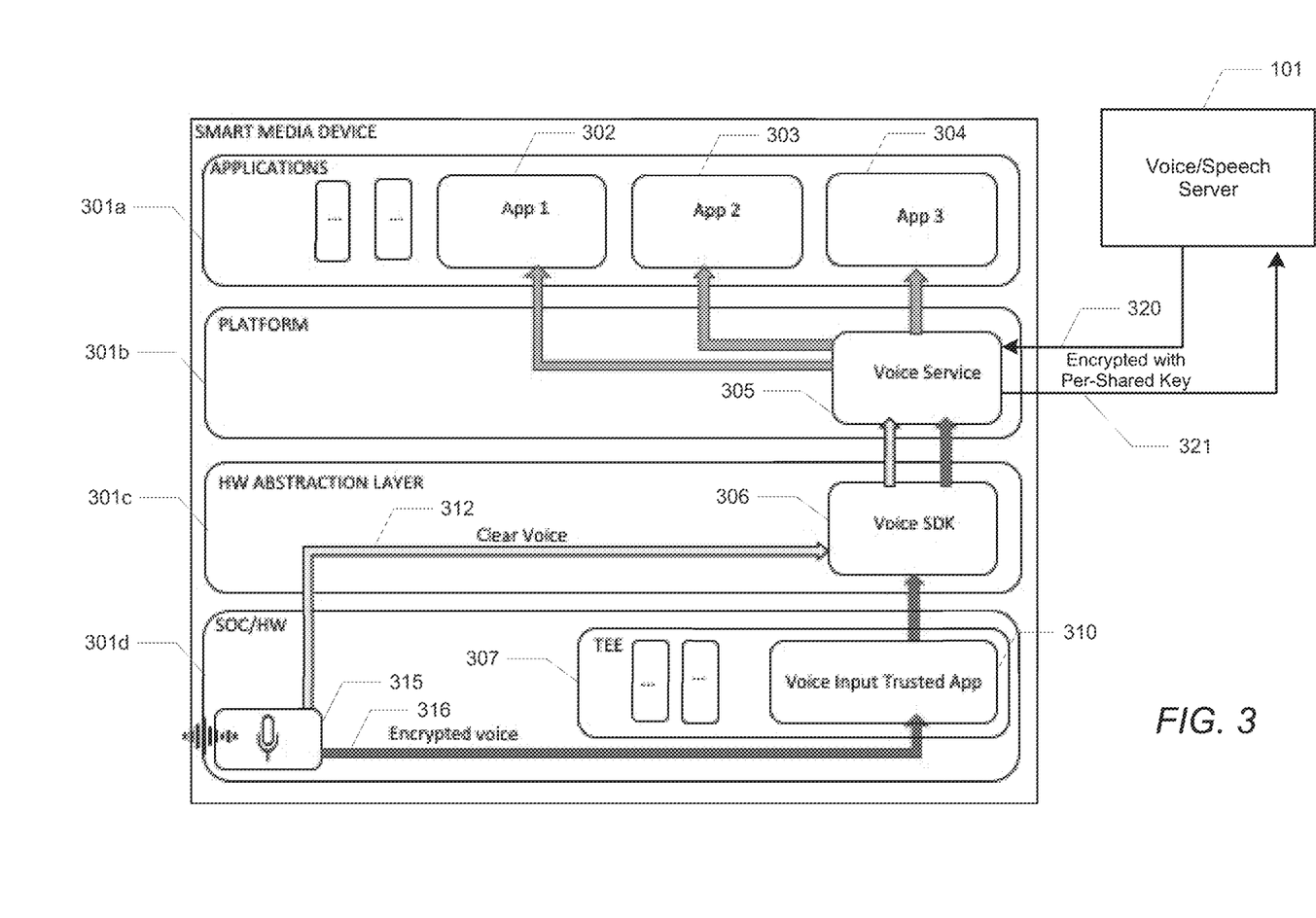
FIG. 3 is a more detailed schematic diagram of a smart media device implemented in the system of FIG. 1 according to an embodiment of the present disclosure.

FIG. 3 is a more detailed schematic diagram of system software layers within a smart media device implemented in the system of FIG. 1 according to an embodiment of the present disclosure. System software within the smart media device 7 comprises a plurality of applications 302-304 within an application layer 301a, voice services 305 within a platform layer 301b, a voice software developer kit (SDK) 306 within a hardware abstraction layer 301c, and a trusted execution environment (TEE) 307 within a system hardware layer 301d. The applications 302-304 are software programs that may be downloaded onto the smart media device 7 from a content server 102 in order to permit the smart media device 7 to obtain streaming media content from the content server 102 for display to the user.

These applications 302-304 are created and provided to users from entities unknown to the smart media device 7 and are not considered to be trusted applications. Hackers and other untrustworthy parties may attempt to utilize these applications 302-304 to gain control over the smart media device 7 and cause it to operate in an undesired manner without knowledge of its operation by the user. The present invention adds a level of security to the operation of the smart media device 7 to thwart the attempts of these third parties.

The voice service 305 in the platform layer 301b connects the applications 302-304 to voice command data received from the user via a microphone 315. The voice command data may include clear voice data 312 (e.g., unencrypted voice data), encrypted voice data 316 processed within the TEE 307, and encrypted voice data 316 processed by the voice-speech server 304. Depending upon settings of the smart media device 7, the applications 302-304 may obtain either encrypted data 316 from the microphone 315 or clear voice data 312 from the microphone 315. These settings may be controlled by a user of the smart media device 7. The applications 302-304 also may request that encrypted data 316 is processed from the microphone 315. The microphone 315 may connect to an input that generates the encrypted data 316 immediately upon receipt and never stores clear voice data into memory of the smart media device 7 preventing its availability to any application 302-304. An encryption key is stored into the smart media device 7 that is used by the microphone 315 to generate the encrypted data 316. This encryption key may be generated and stored at the time of manufacture.

The TEE 307 is a trusted program running in hardware-protected memory that is inaccessible by the applications 302-304. If an application is not certified to run in the TEE 307, a fault exception is noted, the memory access is not performed, and the controller 33 may terminate operation of the offending application and any other related operations. The TEE 307 is embedded into the system software of the smart media device 7. A voice input trusted application 310 is used to decrypt the encrypted data 316 received from the microphone 315 and then processes the voice command data to generate commands for instructing the applications 302-304 to perform various tasks. For example, one application 302 may provide the user with access to streaming media data from Netflix™. The user may provide voice commands to search for a particular video to watch, to start, pause, restart, and stop the streaming video from the Netflix™ content server 102, enter account and password information, and the like.

When the user has set the smart media device 7 to operate with encrypted data 316, the TEE 307 processes the data using the same encryption key as was used by the microphone 315. The decrypted data is then sent to the voice services 305 to generate the various application commands that instruct the application 302 what to do. When a voice-speech server 101 is used, the encrypted data 316 is passed from the TEE 307 to the voice services 305. The voice services 305 transmits the encrypted data 321 to the voice-speech server 101 for processing. The resulting commands 320 are received by the voice services 305 for transmission to the application 302.

In a case in which the smart media device 7 is set to not use encrypted data 316, clear voice data 312 is sent from the microphone 315 to the voice services 305 directly while bypassing the TEE 307. The voice services 305 determine whether the voice command data is to be processed on the smart media device 7 by the voice services 305 or by the application 302, or whether or not the voice command data is to be sent to the voice-speech server 101. The unencrypted data 312 is sent to the appropriate destination.

Figure 4:
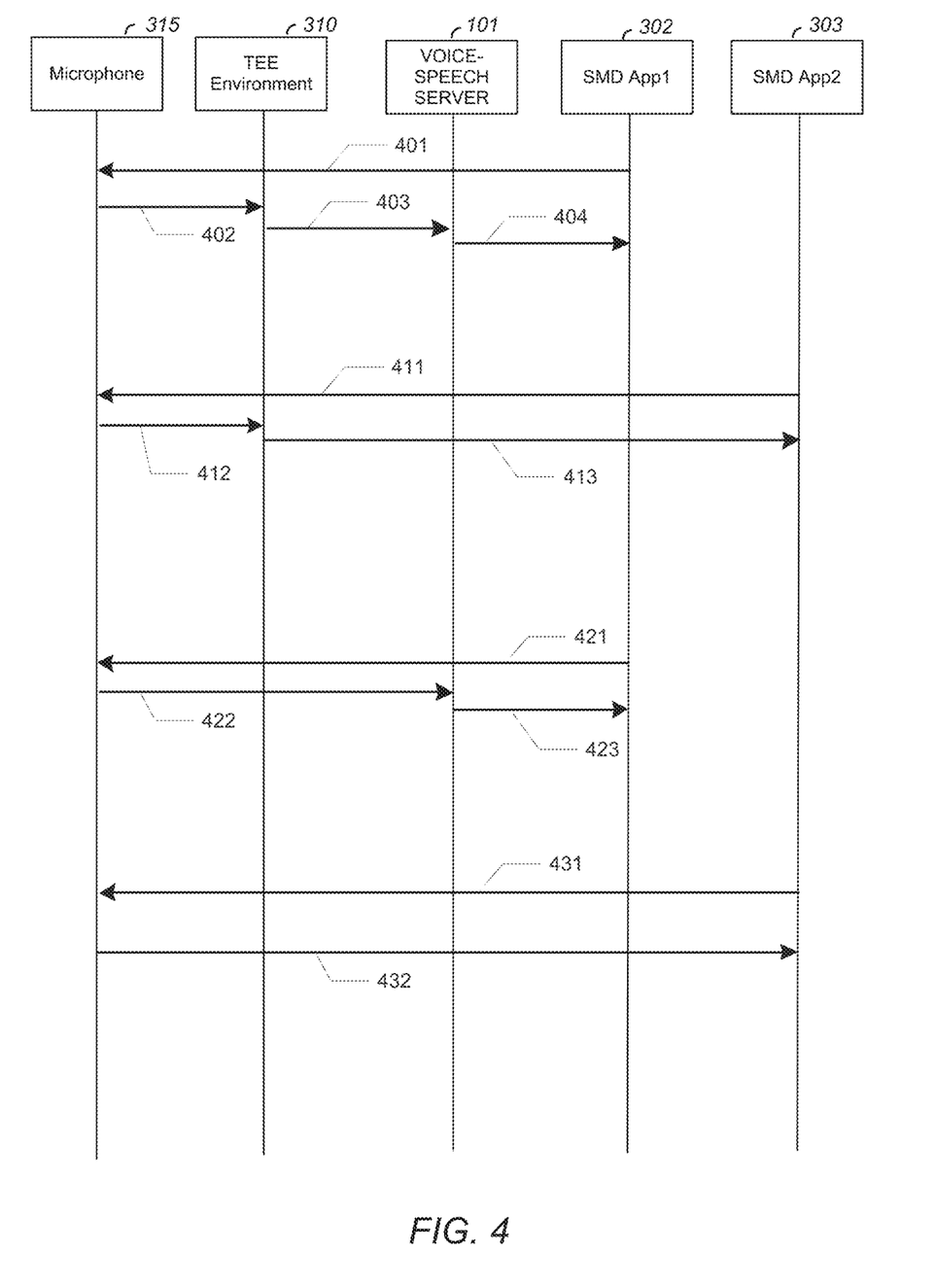
FIG. 4 illustrates a method and algorithm for providing secure voice commands to an application executing within the smart media device while attached to the Internet according to an embodiment of the present disclosure.

FIG. 4 illustrates a method and algorithm for providing secure voice commands to an application executing within the smart media device while attached to the Internet according to an embodiment of the present disclosure. In FIG. 4, it is assumed that the smart media device 7 includes its respective software 32 stored in its memory 31 which, when executed by the controller 33, performs the function and operations in accordance with the embodiments described in the present disclosure (e.g., including providing secure voice commands to an application executing within the smart media device while attached to the Internet according to the embodiments of the present disclosure, and including performing various processes constituting operation of the TEE 307). The smart media device also comprises its microphone 315, TEE 307, voice services 305, and applications 302-304.

The voice-speech server 101 also may be connected to the smart media device 7 over the Internet 6.

The method and algorithm of FIG. 4 provides the data flow of the voice commands provided by the user to the smart media device 7 through to the applications 302-304 in which the commends are directed. In the first sequence of operations encrypted data 316 is processed by a voice speech server 101. The sequence begins in step 401 when application 1 302 requests voice data commands to be received from the user. Voice audio data is obtained by the microphone and immediately encrypted using a pre-stored encryption key in step 402 before the encrypted data 316 is sent to the TEE 307. In step 403, the TEE 307 decrypts the encrypted data using the pre-stored key and sends the data to the voice-speech server 101. The voice-speech server 101 returns application commands in step 404 to application 1 302 that instructs the application how it is to perform. The data flow of steps 401-404 are identical when the voice-speech server 101 performs the decryption of the voice command data and the processing of the decrypted data to generate application commands. In the latter sequence, the TEE 307 merely forwards the encrypted voice data to the voice-speech server 101 without further processing.

In another sequence of data flow, application 2 303 requests voice command data be captured in step 411 using encrypted data. In step 412, voice command data is captured by the microphone and immediately encrypted before it is sent to the TEE 307. The TEE 307, in step 413, decrypts the encrypted data and generates application commands. The application commands are sent to application 2 303 in step 413 for execution.

In yet another data flow sequence, application 1 302 requests voice command data to be captured in step 421. The smart media device 7 is not operating in a secure mode and does not encrypt the captured voice data. In step 422, the voice command data is sent to the voice-speech server 101 and application commands are returned to application 1 302 in step 423.

In a final data flow sequence, application 2 303 requests voice command data be captured in step 431. Once again, the smart media device 7 is not operating in a secure mode and does not encrypt the captured voice data. The microphone 316 sends clear voice data 314 to application 2 303 directly via the voice services 305. Application 2 303 performs all voice processing to detect and decode commands from the voice command data.

Figure 5:
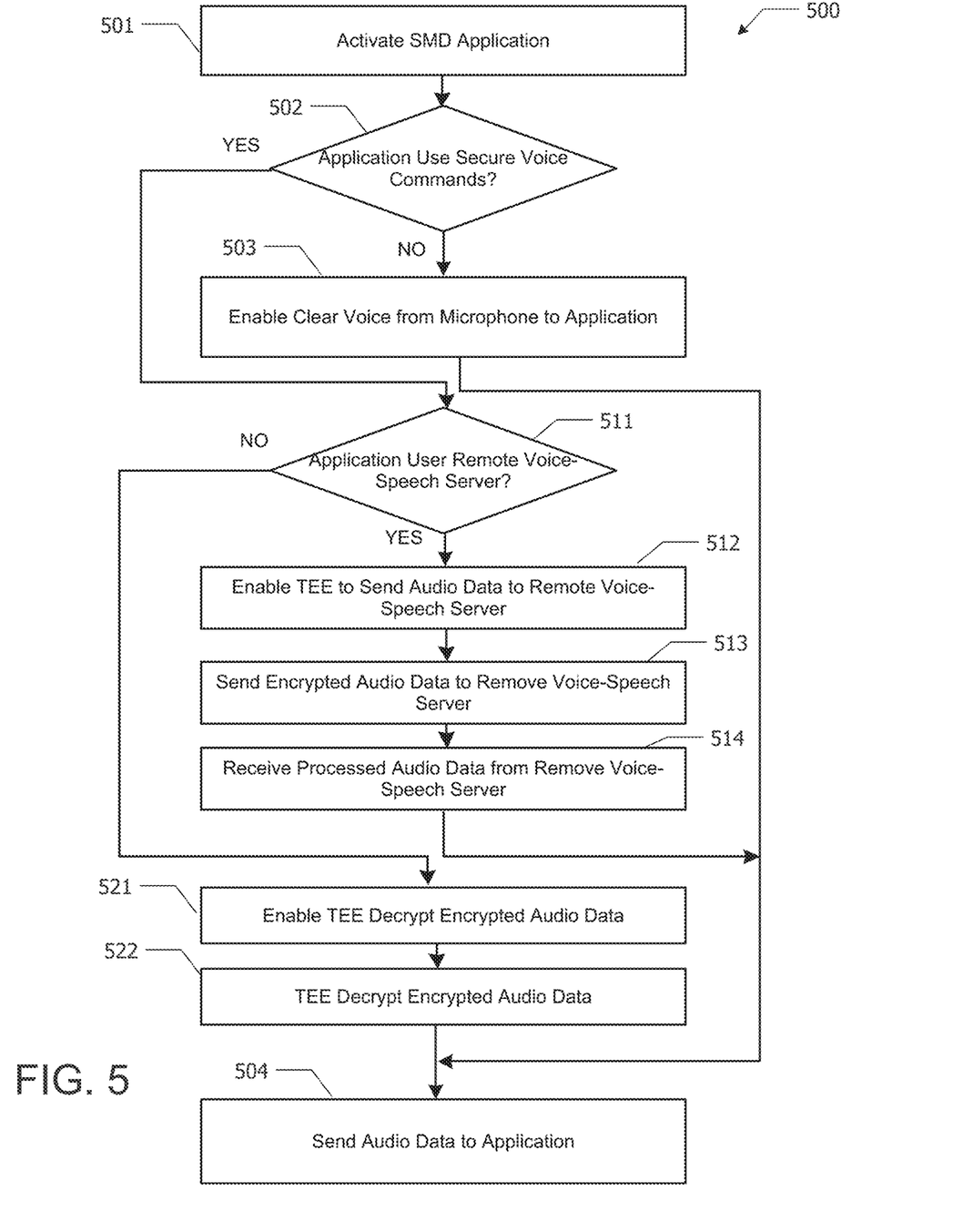
FIG. 5 illustrates a method and algorithm for providing secure voice commands to an application executing within the smart media device while attached to the Internet according to an embodiment of the present disclosure.

FIG. 5 illustrates a method and algorithm for providing secure voice commands to an application executing within the smart media device while attached to the Internet according to an embodiment of the present disclosure. In FIG. 5, it is assumed that the smart media device 7 includes its respective software 32 stored in its memory 31 which, when executed by the controller 33, performs the function and operations in accordance with the embodiments described in the present disclosure (e.g., including providing secure voice commands to an application executing within the smart media device while attached to the Internet according to the embodiments of the present disclosure). The smart media device also comprises its microphone 315, TEE 307, voice services 305, and applications 302-304. The voice-speech server 101 also may be connected to the smart media device 7 over the Internet 6.

The process 500 begins when the user activates a smart media device application in step 501. It is assumed that the application has been previously installed by the user from its source into the smart media device 7. In test step 502, the smart media device 7 controller 33 determines whether or not the application is to use secure voice commands. As noted above, the mode of operation in using either secure voice commands or unencrypted commands is controlled by a user setting of the smart media device. When the secure voice commands are not to be used, the controller 33 enables the use of clear voice data 314 in step 503 and the voice data is sent to the application in step 504.

When the controller in test step 502 determines that secure voice commands are to be used, test step 511 is used by the controller 33 to determine whether or not a remote voice-speech server 101 is to be used. When a remote voice-speech server 101 is to be used, the TEE 307 is enabled to send audio data to the remote voice-speech server in step 512. The encrypted voice command data 316 is sent to the voice-speech server 101 in step 513. The responsive application commands are received in step 514 by the smart media device 7. The application commands are sent to the application in step 504.

When a remote voice-speech server 101 is not to be used, the TEE 307 is enabled to decrypt the voice command data 316 in step 521. The TEE, in step 522, decrypts the voice command data 316 and its voice data is sent to the application in step 504. In using the encrypted voice command data 316, the clear voice data 314 is not stored into the memory of the smart media device 7. If the clear voice data 314 is never in the memory of the smart media device, the voice data cannot be improperly captured by a rogue application. The method and algorithm of FIG. 5 address this problem.

The present disclosure may be implemented as any combination of an apparatus, a system, an integrated circuit, and a computer program on a non-transitory computer readable recording medium. The one or more processors may be implemented as an integrated circuit (IC), an application specific integrated circuit (ASIC), large scale integrated circuit (LSI), system LSI, super LSI, or ultra LSI components that perform a part or all of the functions described in the present disclosure.

The present disclosure includes the use of software, applications, computer programs or algorithms. The software, applications, computer programs or algorithms can be stored on a non-transitory computer-readable medium for causing a computer, such as the one or more processors, to execute the steps described in FIGS. 3 and 4. For example, the one or more memories store software or algorithms with executable instructions and the one or more processors can execute a set of instructions of the software or algorithms in association with providing monitoring and installation enhancements in any number of wireless networks in accordance with the embodiments described in the present disclosure.

The software and computer programs, which can also be referred to as programs, software applications, applications, components or code, include machine instructions for a programmable processor and can be implemented in a high-level procedural language, an object-oriented programming language, a functional programming language, a logical programming language or an assembly language or machine language. The term computer-readable recording medium refers to any computer program product, apparatus or device, such as a magnetic disk, optical disk, solid-state storage device, memory, and programmable logic devices (PLDs), used to provide machine instructions or data to a programmable data processor, including a computer-readable recording medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices or any other medium that can be used to carry or store desired computer-readable program code in the form of instructions or data structures and that can be accessed by a general-purpose or special-purpose computer or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above also are included within the scope of computer-readable media.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner. The subject matter of the present disclosure is provided as examples of apparatus, systems, methods, and programs for performing the features described in the present disclosure. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability or configuration set forth in the claims. Changes may be made in the function and arrangement of elements discussed without departing from the spirit and scope of the disclosure. Various embodiments may omit, substitute or add various procedures or components as appropriate. For instance, features described with respect to certain embodiments may be combined in other embodiments.

We claim:

1. A smart media device for secure voice commands to an application executing within the smart media device while attached to the Internet, the Internet communicatively interconnects the smart media device with a remote voice-speech server and one or more content servers, the smart media device comprising:
   a secure microphone input for accepting audio data containing voice commands and providing encrypted audio data using a pre-stored encryption key;
   a trusted execution environment configured to decrypt the encrypted audio data from the secure microphone input;
   a memory having instructions stored thereon; and
   a processor configured to execute one or more instructions on the memory to cause the smart media device to:
      based on a determination that the application uses secure voice commands and the remote voice-speech server, perform the following:
         within the trusted execution environment: receive and decrypt the encrypted audio data;
         send the decrypted audio data to the remote voice-speech server for processing so as to cause the remote voice-speech server to generate one or more application commands;
         receive, by the application, the one or more application commands; and
         perform, by the application, the one or more application commands; and
      based on a determination that the secure voice commands are not to be processed by the remote voice-speech server, perform the following:
         receive the encrypted audio data in the trusted execution environment;
         receive and decrypt, within the trusted execution environment, the encrypted audio data;
         generate, within the trusted environment, one or more other application commands corresponding to processing decrypted voice commands;
         receive, by the application, the one or more other application commands; and
         perform, by the application, the one or more other application commands.

2. The smart media device according to claim 1, wherein the smart media device utilizes a user-controlled setting to enable use of the secure voice commands.

3. The smart media device according to claim 1, wherein the secure microphone input and the trusted execution environment use the pre-stored encryption key pre-stored into the smart media device at time of manufacture.

4. The smart media device according to claim 1, wherein the processor is further configured to execute additional instructions to:
   based on determining that the application does not use secure voice commands, perform the following instructions:
      enable the secure microphone input to transmit voice data to a voice service environment, the voice service environment configured to execute the instructions on the memory by the processor to:
         receive voice data from the secure microphone input;
         generate the one or more other application commands from the voice data; and
         send the one or more other application commands to the application.

5. The smart media device according to claim 1, wherein the processor is further configured to execute additional instructions to:
   based on a determining that the application does not use secure voice commands, perform the following instructions:
      enable the secure microphone input to transmit voice data; and
      send the voice data to the application.

6. A method for receiving secure voice commands by an application executing within a smart media device while attached to the Internet, the Internet communicatively interconnecting the smart media device with a remote voice-speech server and one or more content servers, the smart media device having a secure microphone input for accepting audio data containing voice commands and providing encrypted audio data using a pre-stored encryption key and a trusted execution environment for decrypting the encrypted audio data from the secure microphone input, the method comprising:
   based on determining that the application uses secure voice commands and the remote voice-speech server, performing the following:
      enabling the trusted execution environment to receive and decrypt the encrypted audio data;
      sending the decrypted audio data to the remote voice-speech server for processing so as to cause the remote voice-speech server to generate one or more application commands;
      receiving, by the application, the one or more application commands; and performing, by the application, the one or more application commands; and based on determining that the secure voice commands are not to be processed by the remote voice-speech server, perform the following:
- receiving the encrypted audio data in the trusted execution environment;
- receiving and decrypt, within the trusted execution environment, the encrypted audio data;
- generating, within the trusted environment, one or more other application commands corresponding to processing decrypted voice commands;
- receiving, by the application, the one or more other application commands; and
- performing, by the application, the one or more other application commands.

7. The method according to claim 6, wherein the smart media device utilizes a user-controlled setting to enable use of the secure voice commands.

8. The method according to claim 6, wherein the secure microphone input and the trusted execution environment use the pre-stored encryption key pre-stored into the smart media device at time of manufacture.

9. The method according to claim 6, wherein the method further comprises:
based on determining that the application does not use secure voice commands, performing the following:
- enabling the secure microphone input to transmit voice data to a voice service environment, the voice service environment performing the following:
  - receiving voice data from the secure microphone input;
  - generating the one or more other application commands from the voice data; and
  - sending the one or more other application commands to the application.

10. The method according to claim 6, wherein the method further comprises:
based on determining that the application does not use secure voice commands, performing the following instructions:
- enabling the secure microphone input to transmit voice data; and
- sending the voice data to the application.

11. A non-transitory computer-readable recording medium in a smart media for receiving secure voice commands by an application executing within the smart media device while attached to the Internet, the Internet communicatively interconnects the smart media device with a remote voice-speech server and one or more content servers, the smart media device having a secure microphone input for accepting audio data containing voice commands and providing encrypted audio data using a pre-stored encryption key and a trusted execution environment for decrypting the encrypted audio data from the secure microphone input, the non-transitory computer-readable recording medium storing one or more programs which when executed by a controller of the smart media device performs a method comprising:

based on determining that the application uses secure voice commands and the remote voice-speech server, performing the following:
- enabling the trusted execution environment to receive and decrypt the encrypted audio data;
- sending the decrypted audio data to the remote voice-speech server for processing so as to cause the remote voice-speech server to generate one or more application commands;
- receiving, by the application, the one or more application commands; and
- performing, by the application, the one or more application commands; and in response to determining that the secure voice commands are not to be processed by the remote voice-speech server, performing the following:
enabling the trusted execution environment to receive the encrypted audio data;
receiving and decrypting, by the trusted execution environment, the encrypted audio data;
generating the one or more other application commands corresponding to processing decrypted voice commands, by the trusted execution environment;
receiving, by the application, the one or more other application commands; and
performing, by the application, the one or more other application commands.

12. The computer-readable recording medium according to claim 11, wherein:
the smart media device utilizes a user-controlled setting to enable use of the secure voice commands; and
the secure microphone input and the trusted execution environment use the pre-stored encryption key pre-stored into the smart media device at time of manufacture.

13. The computer-readable recording medium according to claim 11, wherein the method further comprises:
based on determining that the application does not use secure voice commands, performing the following instructions:
- enabling the secure microphone input to transmit a clear voice data to a voice service environment, the voice service environment performing the following:
  - receiving the clear voice data from the secure microphone input;
  - generating the one or more other application commands from the clear voice data; and
  - sending the application commands to the application.

14. The computer-readable recording medium according to claim 11, wherein the method comprises:
based on determining that the application does not use secure voice commands, performing the following instructions:
- enabling the secure microphone input to transmit voice data; and
- sending the voice data to the application.

* * * * *